United States Patent
Ko et al.

(10) Patent No.: US 8,666,426 B2
(45) Date of Patent: Mar. 4, 2014

(54) ADAPTIVE TRANSMISSION DEVICE USING LIMITED FEEDBACK INFORMATION IN A MOBILE COMMUNICATION SYSTEM, AND A METHOD THEREOF

(75) Inventors: Young-Jo Ko, Daejeon (KR);
Jae-Young Ahn, Daejeon (KR);
Kwang-Soon Kim, Daejeon (KR);
Jung-Hyoung Kwon, Yeongju (KR);
Keum-Chan Whang, Seoul (KR)

(73) Assignees: Electronics and Telecommunications Research Institute, Daejeon (KR);
Industry-Academic Cooperation Foundation, Yonsei Univeristy, Seoul (KR)

(*) Notice: Subject to any disclaimer, the term of this patent is extended or adjusted under 35 U.S.C. 154(b) by 1054 days.

(21) Appl. No.: 12/096,324

(22) PCT Filed: Dec. 19, 2005

(86) PCT No.: PCT/KR2005/004377
§ 371 (c)(1),
(2), (4) Date: Jun. 5, 2008

(87) PCT Pub. No.: WO2007/066486
PCT Pub. Date: Jun. 14, 2007

(65) Prior Publication Data
US 2008/0305818 A1    Dec. 11, 2008

(30) Foreign Application Priority Data
Dec. 5, 2005 (KR) .................. 10-2005-0117476

(51) Int. Cl.
*H04W 72/00* (2009.01)

(52) U.S. Cl.
USPC ............ 455/452.2; 455/450; 455/452.1; 455/67.11; 455/67.13; 455/68; 455/69; 455/522; 455/561; 370/329; 370/332; 370/333; 370/436; 370/437

(58) Field of Classification Search
USPC ............... 455/450, 452.1, 452.2, 453, 67.11, 455/67.13, 63.1, 68, 69, 522, 500, 507, 509, 455/512, 513, 515, 561; 370/328–334, 370/431–433, 436–437, 441–442
See application file for complete search history.

(56) References Cited

U.S. PATENT DOCUMENTS 6,904,283 B2    6/2005    Li et al.
6,980,612 B1    12/2005   Miyoshi
(Continued)

FOREIGN PATENT DOCUMENTS

EP    1 533 966       5/2005
JP    2001-168777    6/2001
(Continued)

OTHER PUBLICATIONS

International Search Report for PCT/KR2005/004377 dated May 27, 2008.

(Continued)

*Primary Examiner* — Tuan A Tran
(74) *Attorney, Agent, or Firm* — Kile Park Reed & Houtteman PLLC

(57) ABSTRACT

The present invention relates to an adaptive transmitting device using limited feedback information in a mobile communication system, and a method thereof. According to an exemplary embodiment of the present invention, when the base station transmits a pilot signal to the terminal, the terminal generates channel information by using the pilot signal, generates additional channel information from the channel information, and transmits the channel information and the additional channel information to the base station. The base station determines band allocation, power allocation, and modulation methods for each use by using received feedback information, and transmits modulated traffic data to the terminal according to the determined methods.

4 Claims, 18 Drawing Sheets

(56) References Cited

U.S. PATENT DOCUMENTS

| | | | |
|---|---|---|---|
| 7,069,009 B2 * | 6/2006 | Li et al. | 455/446 |
| 7,072,315 B1 * | 7/2006 | Liu et al. | 370/329 |
| 7,162,211 B2 * | 1/2007 | Viswanath et al. | 455/101 |
| 7,440,437 B2 * | 10/2008 | Song | 370/343 |
| 7,535,869 B2 * | 5/2009 | Yoon et al. | 370/329 |
| 2004/0190484 A1 | 9/2004 | Shin et al. | |

FOREIGN PATENT DOCUMENTS

| | | |
|---|---|---|
| JP | 2002-290317 | 10/2002 |
| KR | 10-2002-0092747 | 12/2002 |
| KR | 10-2004-0083787 | 10/2004 |
| KR | 10-2006-0078880 | 7/2006 |
| WO | 02/49306 | 6/2002 |
| WO | 2004/073200 | 8/2004 |

OTHER PUBLICATIONS

Written Opinion for PCT/KR2005/004377, May 2008.

Zhong-Hai Han, "Opportunistic Scheduling with Partial Channel Information in OFDMA/FDD Systems", IEEE, 2004, pp. 511-514.

Patriack Svedman et al., "A Simplified Opportunistic Feedback and Scheduling Scheme for OFDM", IEEE 2004, pp. 1878-1882.

Didem Kivanc, et al., "Computationally Efficient Bandwith Allocation and Power Control for OFDMA", IEEE Transactins on Wireless Communications, vol. 2, No. 6, Nov. 2003, pp. 1150-1158.

3rd Generation Partnership Project, Technical Specification Group Radio Access Network, Evolved Universal Terrestrial Radio Access (E-UTRA), Physical layer procedures (Release 8); Sep. 2009; 3GPP Organizational Partners, France.

* cited by examiner

Fig. 18

| Total number of bands | 96 channel |
| --- | --- |
| Number of allocated band for each terminal | 8 channel |
| Number of bits for each terminal | 5 bits/channel |
| Number of band location information bits | 7 bits/channel |

| | All band Transmission | Selected band transmission |
| --- | --- | --- |
| Number of required bits | 480 bits | 101 bits |

US 8,666,426 B2

ADAPTIVE TRANSMISSION DEVICE USING LIMITED FEEDBACK INFORMATION IN A MOBILE COMMUNICATION SYSTEM, AND A METHOD THEREOF

TECHNICAL FIELD

The present invention relates to an adaptive transmitting device using limited feedback information in a mobile communication system, and a method thereof. More specifically, the present invention relates to an adaptive transmitting device using limited feedback information in a mobile communication system performing adaptive transmission, by using location information and additional information on selected bands when channel information on each terminal is transmitted from a mobile terminal to a base station in order to use a downlink adaptive transmission method in a frequency division multiple access mobile communication system.

BACKGROUND ART

To provide mobile communication services to a plurality of users, it is required to physically divide communication path capacity. A multiplexing method and a multiple access method are used to divide the communication path capacity. In the multiplexing method, a transmitter transmits a signal in a frequency division multiplexing (FDM) method or a time division multiplexing (TDM) method when a communication path is used between two base stations. Multiple access methods include a frequency division multiple access (FDMA) method, a time division multiple access (TDMA) method, and a code division multiple access (CDMA) method, in which a plurality of terminals use the divided communication path capacity of one base station.

Among these methods, the frequency division multiple access method is widely used since configurations of antennas, amplification devices, and modulators are simplified, and there is no need to perform complicated synchronization.

FIG. 1 shows a diagram representing a modulation method in a conventional frequency division multiple access mobile communication system.

In the conventional frequency division multiple access mobile communication system, a base station 110 includes a band allocator 112 for each terminal and a modulator 114 following band allocation to each terminal, and a terminal 120 includes a receiver 122 and a demodulator 124.

A transmitter of the base station 110 transmits modulated data to the receiver 122 of each terminal 120 through a radio channel, and the receiver 122 of each terminal 120 restores the data by demodulating the modulated data with the demodulator 124.

However, there is a problem in that performance is reduced since each terminal has different radio channel performance in the above system.

To solve the above problem, an adaptive transmission method for performing channel estimation by the terminal 120 has been suggested.

FIG. 2 shows a diagram representing an adaptive transmission method for performing the channel estimation by the terminal in the frequency division multiple access mobile communication system.

In the adaptive transmission method for performing the channel estimation, a base station 210 additionally includes a pilot signal generator 212, and a terminal 220 additionally includes a channel estimator 222. The pilot signal generator 212 and the channel estimator 222 are not included in the base station of the conventional frequency division multiple access method. The receiver 122 of the terminal 220 is not illustrated in FIG. 2, and will be described assuming that it is included in the demodulator 124.

The transmitter of the base station 210 transmits a pilot signal or a preamble to the receiver of each terminal 220 through the radio channel, the receiver of each terminal 220 uses the pilot signal or the preamble to demodulate data with the demodulator 124, and the channel estimator 222 for estimating a channel frequency response estimates the channel frequency response on each band. Subsequently, channel information on every band is fed back to the base station 210. Then, the band allocator 112 for determining a band allocation method for each terminal determines a band to be allocated to the terminal 220 based on the received channel information. When the band to be allocated to each terminal is determined, the modulator 114 of each band allocated to each terminal modulates data, and adaptively transmits traffic data. Accordingly, performance and capacity in the mobile communication system are increased, which has been suggested in a paper entitled "Computationally Efficient Bandwidth Allocation and Power Control for OFDMA" in IEEE Transaction Wireless Communication Vol. 2 (published 11 2003).

However, in the above method, since channel information on bands which are not allocated to the terminal is also required to be fed back to the base station, overhead of the feedback information is greatly increased, and the receiver of the terminal is required to transmit a large amount of information to the base station. Therefore, the system is deteriorated since power consumption is increased and interference is generated between the terminals. To solve the above problem, a method for transmitting channel information on the bands allocated to the terminal rather than transmitting the channel information on all the bands, and reducing the overhead at the base station without performance degradation, has been suggested in a transaction entitled "'Opportunistic Scheduling with Partial Channel Information in OFDM/FDD Systems" in IEEE Vehicular Technology Conference Vol. 1 (published 9 2004). However, in the above method, there is a problem in that a desired bit error rate may not be obtained since an average value of channel frequency response values of all the bands is used to perform the modulation for the bands which are not allocated to the terminal.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide an adaptive transmitting method for estimating channel frequency response by a terminal by using a pilot signal or a preamble transmitted from a base station, transmitting frequency responses of selected bands and additional information for estimating channel information on all bands for each terminal to the base station, and performing band allocation for each terminal based on the frequency responses and the additional information.

Technical Solution

An exemplary adaptive transmission base station for performing adaptive to transmission by using feedback information transmitted from a terminal in a mobile communication system according to an embodiment of the present invention includes a location information storage unit, an additional information storage unit, a band allocator, a non-allocation band estimation allocator, a band allocation information generator, and an allocated band modulator. The location information storage unit receives selected band channel location information included in the feedback information and stores the received information. The additional information storage unit receives additional information from the terminal, the additional information being that for estimating channels which are not transmitted, and stores the additional information. The band allocator allocates a band to each terminal by using the channel location information and the additional information. The non-allocation band estimation allocator estimates information on empty bands not allocated to the terminal by using the additional information, and allocates the empty bands to the terminal. The band allocation information generator generates information on bands allocated to the terminal by the band allocator and the non-allocation band estimation allocator. The allocated band modulator modulates traffic data according the band information, and transmits the modulated traffic data to the terminal.

In an exemplary method for performing adaptive transmission by a base station by using feedback information transmitted from a terminal in a mobile communication system according to an embodiment of the present invention, a) channel information and additional information generated by the terminal are received, b) the channel information and the additional information are used to estimate a band to be used in the terminal, and the band is allocated to each terminal, c) the additional information is used to generate distance information bands not allocated to the terminal and the band to be allocated to each terminal, d) the distance information is used to estimate a channel value of the band not allocated to the terminal, and the band is allocated to the terminal, and e) traffic data are modulated according to the channel information allocated to the terminal, and the modulated traffic data are transmitted.

In an exemplary method for performing adaptive transmission by a base station by using feedback information transmitted from a terminal in a mobile communication system according to another embodiment of the present invention, a) first feedback information including selected band channel location information and additional information is received from the terminal, b) the channel location information and the additional information are used to estimate a band to be used in the terminal, and the band is allocated to each terminal, c) allocated band information is transmitted to the terminal, and allocation band channel information corresponding to the band information is received as second feedback information from the terminal, and d) traffic data are modulated according to the received allocation band channel information.

An exemplary terminal performing transmitting feedback information to a base station to perform adaptive communication in a mobile communication system according to an embodiment of the present invention includes a channel estimator, a transmission band selector, a location information generator, and an additional channel information generator. The channel estimator estimates channel information by using a pilot signal transmitted from the base station. The transmission band selector selects a band to be transmitted to the base station by using the channel information. The location information generator generates channel location information on the selected band. The additional channel information generator generates additional channel information by using the channel information (the additional channel information transmitted to estimate non-allocated band in the base station).

In an exemplary method for transmitting feedback information to a base station to perform adaptive communication by a terminal in a mobile communication system according to another embodiment of the present invention, a) a pilot signal is received from the base station to generate channel information on all bands, b) the channel information on all the bands is compared to select a channel of a selected band to be transmitted to the base station, c) channel location information and additional channel information are generated from the selected channel, and the channel location information and the additional channel information are transmitted as first feedback information, d) band allocation information on bands to be used is received from the base station, and e) allocation band channel information is generated according to the received band allocation information, and the allocation band channel information as second feedback information is transmitted to the base station.

Advantageous Effects

According to the exemplary embodiment of the present invention, since the channel information on the selected bands for each terminal is fed back or the location information on the allocated channels and the average information on the channel frequency responses are fed back when the frequency division multiple access mobile communication system performs the adaptive transmission, overhead occurring in the base station due to a great deal of information may be reduced, and interference caused by the transmission information may be reduced at the terminal.

In addition, when the same amount of information is transmitted to the base station, the performance in the mobile communication system may be increased by efficiently performing the band allocation for each terminal in a system having frequent channel variations, since the system transmitting the channel information on the selected bands according to the exemplary embodiment of the present invention transmits the channel information more frequently than the conventional system for transmitting all the bands.

DESCRIPTION OF DRAWINGS

FIG. 18 shows a table comparing the amount of information when the terminal transmits the channel information on the selected bands to the base station according to the exemplary embodiment of the present invention, and when the terminal transmits the channel information on all the bands to the base station according to the prior art.

BEST MODE

Figure 1:
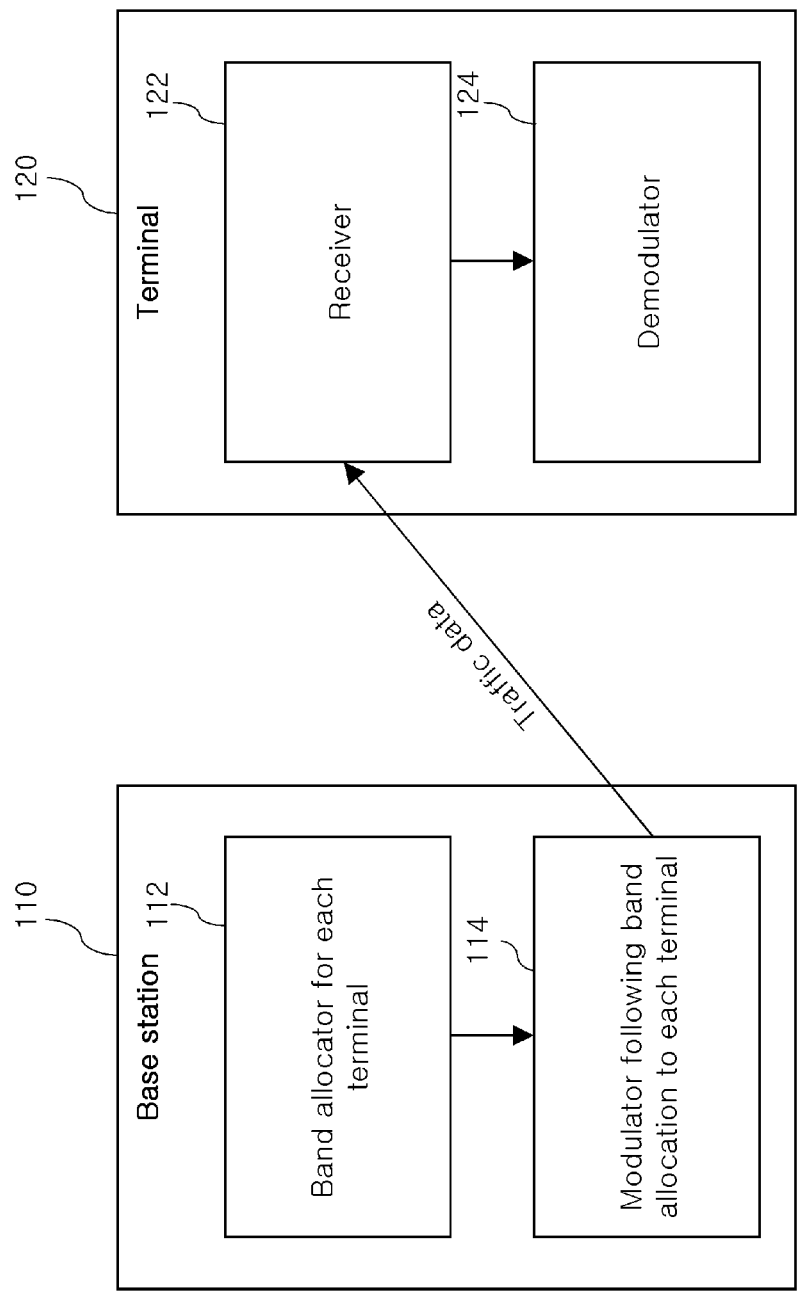
FIG. 1 shows a diagram representing a modulation method in a conventional frequency division multiple access mobile communication system.

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. In addition, the drawings and description are to be regarded as illustrative in nature and not restrictive, and like reference numerals designate like elements throughout the specification.

Throughout this specification and the claims which follow, unless explicitly described to the contrary, the word "comprise" or variations such as "comprises" or "comprising" will be understood to imply the inclusion of stated elements but not the exclusion of any other elements.

In addition, the word "module" will be understood to indicate a unit for processing a predetermined function or operation, which may be realized by hardware, software, or a combination thereof.

A downlink frame configuration in a frequency division multiple access mobile communication system includes a series of slots, and each slot includes more than one symbol. In addition, the respective slots include pilot signals dispersed at time and frequency domains to estimate a channel, and one slot includes a plurality of data channels In addition, a receiver estimates the channel by using the pilot signal and transmits the estimated channel back to a base station, and the base station allocates appropriate bands to respective terminals by using channel information estimated for the respective terminals.

According to the prior art, when the respective terminals transmit the channel information on the respective bands to the base station, the base station selects a terminal having a lot of channel information to allocate a band to the terminal after comparing the channel information on the respective terminals in one band. Therefore, the channel information on the terminals not selected by the base station is not necessary. Therefore, when the unnecessary information is reduced, the amount of information transmitted from the respective terminals to the base station is reduced. However, when the channel information fed back to the base station is reduced as above, it is possible that all the terminals in one band may not transmit the channel information. In this case, additional channel information is fed back to the base station along with the channel information on the selected bands to allocate the band to the terminals, and bands not allocated to the terminal may be allocated by using the additional channel information. In addition, the terminal estimates the channel and transmits channel location information and the additional channel information on the selected bands to the base station, and the base station uses the information to determine the band to be allocated to the respective terminals, transmits the channel information on the bands allocated to the respective terminals, and performs modulation to perform adaptive transmission.

Figure 3:
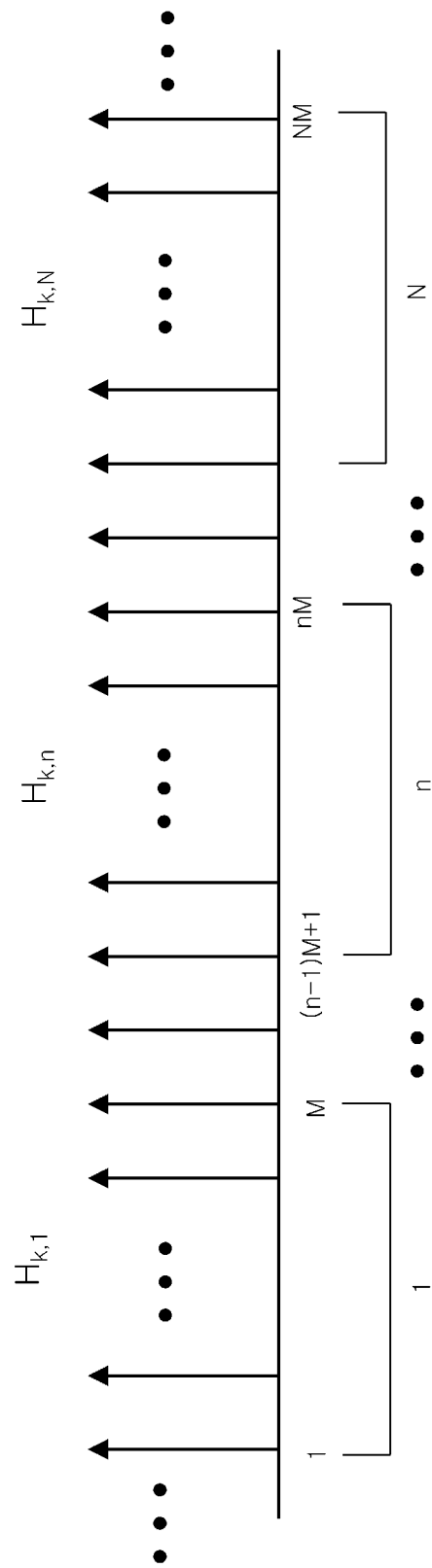
FIG. 3 shows a diagram representing a band expression in a frequency division multiple access mobile communication system.

FIG. 3 shows a diagram representing a band expression in a frequency division multiple access mobile communication system.

In the band expression in the frequency division multiple access mobile communication system, NM subcarriers are divided into N groups of M subcarriers to express a band as shown in FIG. 3. In addition, $h_{k,1}$ denotes a frequency response of a first channel of a $K^{th}$ terminal, $H_{k,n}$ denotes a frequency response of a channel of an $n^{th}$ band of the $K^{th}$ terminal, and $H_{k,n}$ is shown as Math Figure 1.

$$H_{k,n} = \mathrm{argmin}_{m}\{|h_{k,m+(n-1)M}|^2\} \quad \text{[MathFigure 1]}$$

Here, m=1:M, and M denotes the number of subcarriers in one band. A frequency response of a subcarrier, among the respective subcarriers in a band, having a least square value of absolute value of a channel frequency response is selected as $H_{k,n}$. Since the channel information transmitted to the base station by the terminal uses $H_{k,n}$ and a received signal-to-noise ratio (SNR) is in proportion to $H_{k,n}$, the terminal transmits the channel information to the base to station in the same manner.

Figure 4:
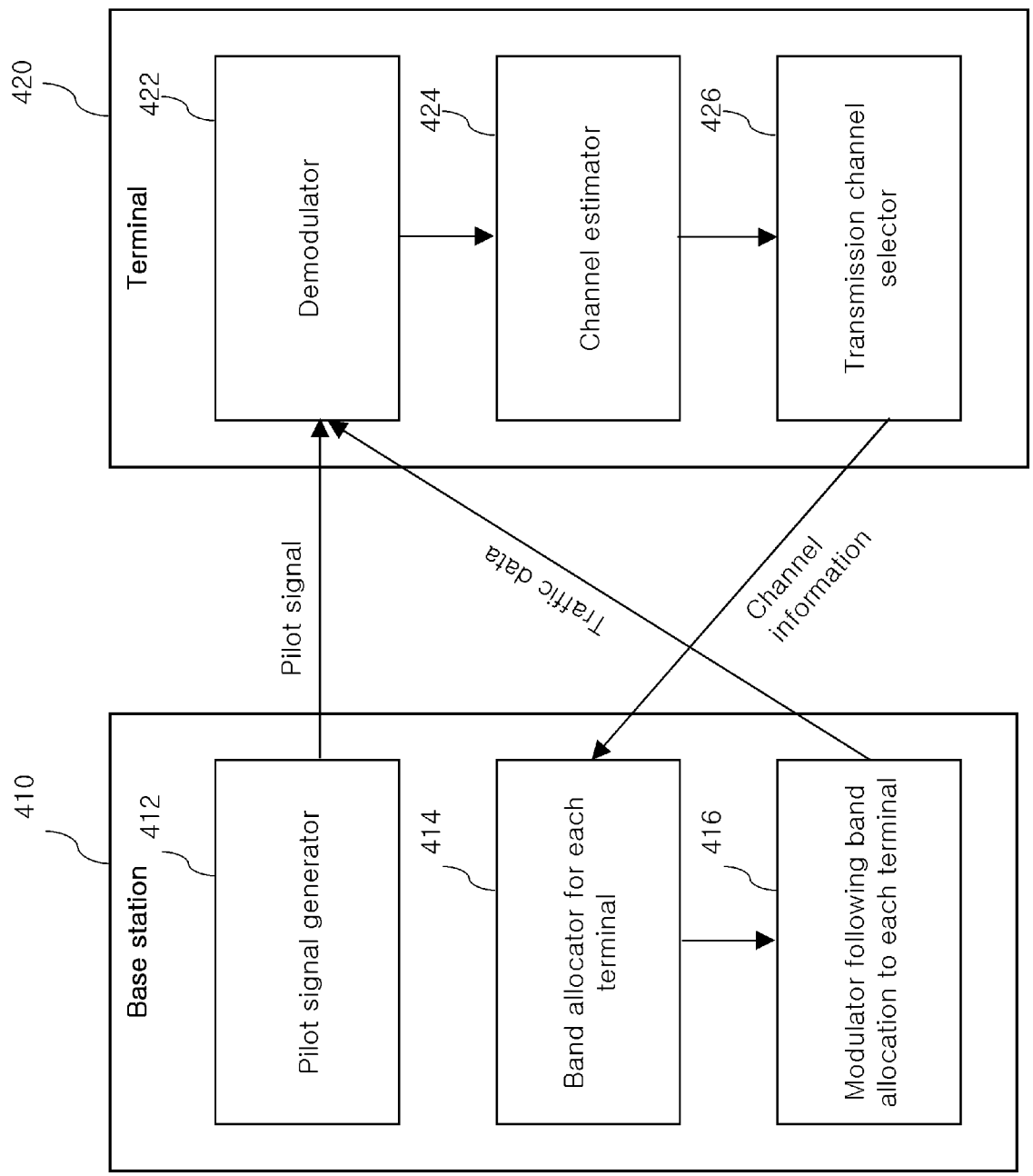
FIG. 4 shows a diagram representing an adaptive modulation method for performing the channel estimation by the terminal of the frequency division multiple access mobile communication system according to an exemplary embodiment of the present invention.

FIG. 4 shows a diagram representing an adaptive modulation method for performing the channel estimation by the terminal of the frequency division multiple access mobile communication system according to an exemplary embodiment of the present invention.

A base station 410 using the adaptive modulation method for performing the channel estimation by the terminal according to the exemplary embodiment of the present invention includes a pilot signal generator 412, a band allocator 414 for each terminal, and a modulator 416 of each band allocated to each terminal, and a terminal 420 includes a demodulator 422, a channel estimator 424, and a transmission channel selector 426.

When a pilot signal generated by the pilot signal generator 412 of the base station 410 is transmitted to the terminal 420, the demodulator 422 of the terminal 420 demodulates the pilot signal or a preamble, the channel estimator 424 estimates a radio channel, and the transmission channel selector 426 selects a band to be transmitted to the base station 410. In addition, the channel information on the band selected by the terminal 420 is transmitted to the base station 410. The band allocator 414 of the base station 410 uses the channel information received from the terminal 420 to allocate bands used by the respective terminals, and the modulator 416 determines a modulation method according to the channel information on the band allocated to each terminal and generates traffic data to transmit it to the terminal 420. The demodulator 422 of the terminal 420 demodulates the received traffic data.

Figure 5:
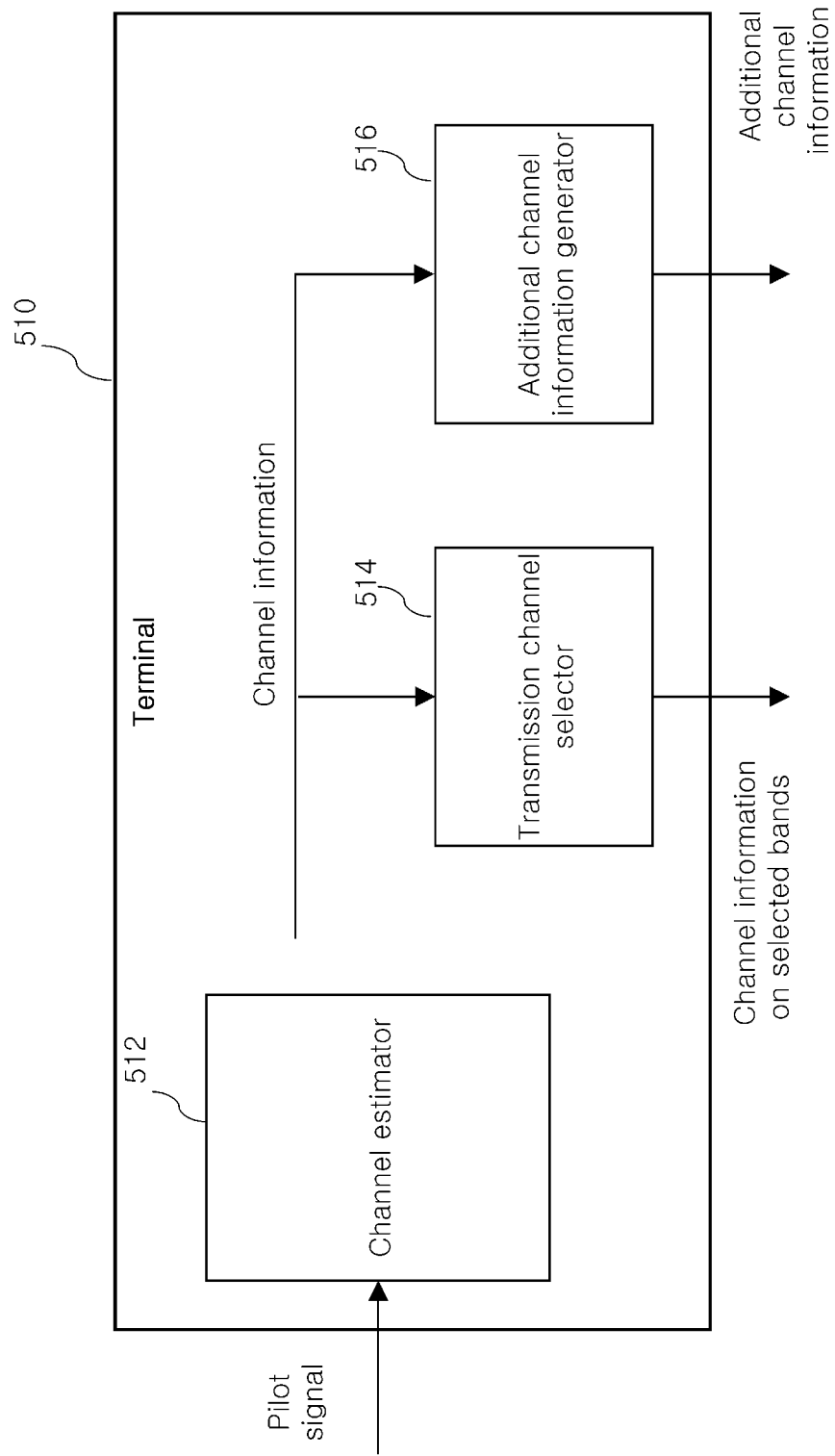
FIG. 5 a block diagram representing a device for selecting the band to be transmitted to the base station based on the channel information estimated by the terminal according to the exemplary embodiment of the present invention.

FIG. 5 a block diagram representing a device for selecting the band to be transmitted to the base station based on the channel information estimated by the terminal according to the exemplary embodiment of the present invention.

A channel estimator 512 of the terminal 510 estimates a channel frequency response between the base station and the terminal by using the received pilot signal.

Figure 2:
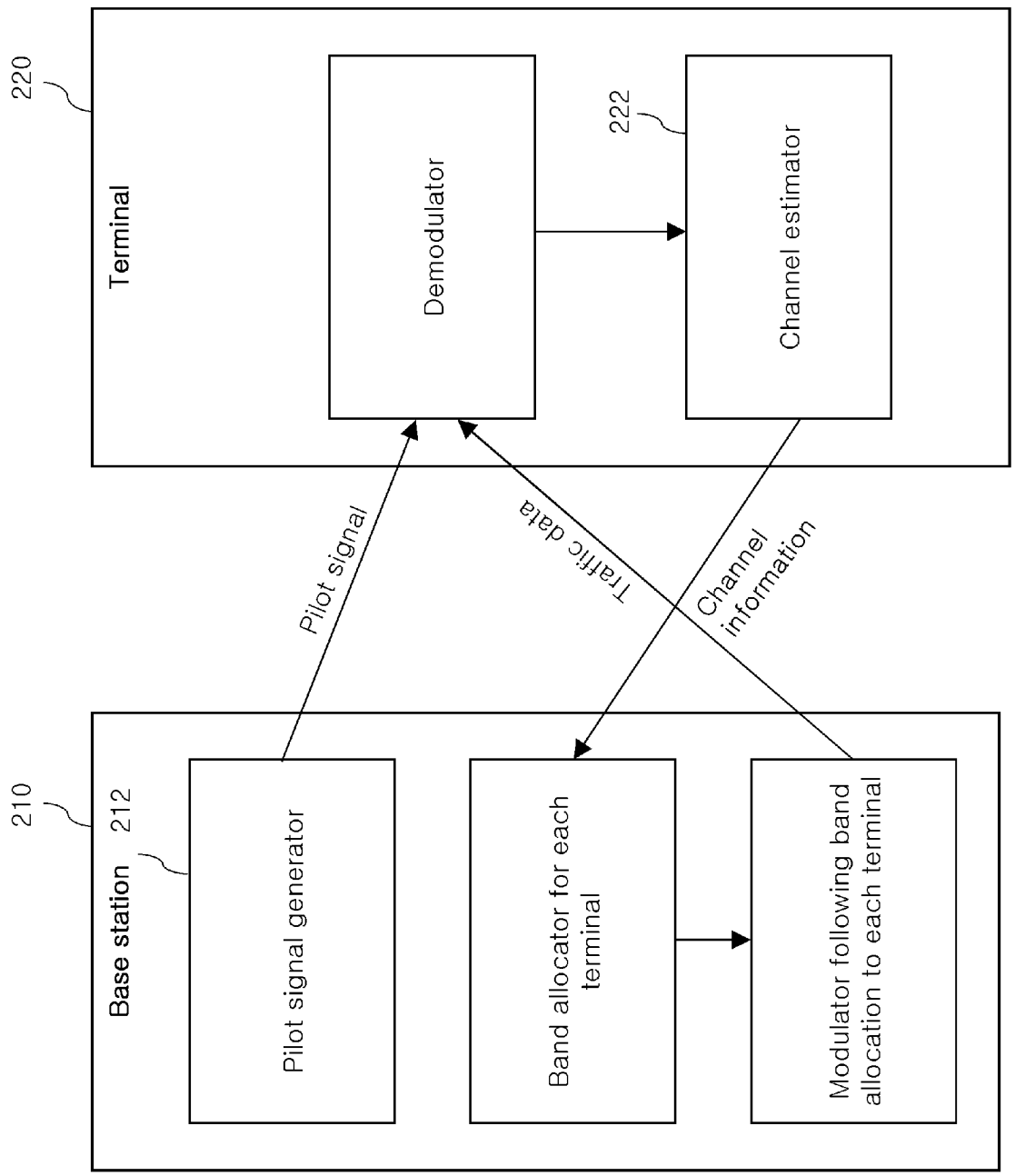
FIG. 2 shows a diagram representing an adaptive transmission method for performing the channel estimation by the terminal in the frequency division multiple access mobile communication system.

A transmission band selector 514 transmits selected band channel information calculated as Math Figure 2 to the base station by using the estimated channel information.

$$CH_k(l)=y_k(l) \quad \text{[Math Figure 2]}$$

Here, i=1:I, and I denotes the number of selected bands transmitted from the terminal to the base station. In addition, $CH_k(i)$ denotes an $i^{th}$ element of a channel selected to be transmitted from a $k^{th}$ terminal to the base station, $y_k(i)$ denotes an $i^{th}$ element of a sequence of $\{H_{k,n}\}$ arranged in descending power, and N denotes the number of channels of all the bands between the terminal and the base station.

In addition, an additional channel information generator 516 generates additional channel information representing characteristics of the all channels by using the channel information from the channel estimator 512, and transmits it to the base station. As shown in Math Figure 3, the additional channel information generator 516 generates the additional channel information to be transmitted to the base station by using the channel information estimated to by the channel estimator 512 (i.e., the additional channel information generator 516 generates the channel information for estimating the channels not transmitted to the base station).

$$D_k=\max(|H_{k,1}-H_{k,2}|,|H_{k,2}-H_{k,3}|,\ldots,|H_{k,N-1}-H_{k,N}|) \quad \text{[Math Figure 3]}$$

Figure 6:
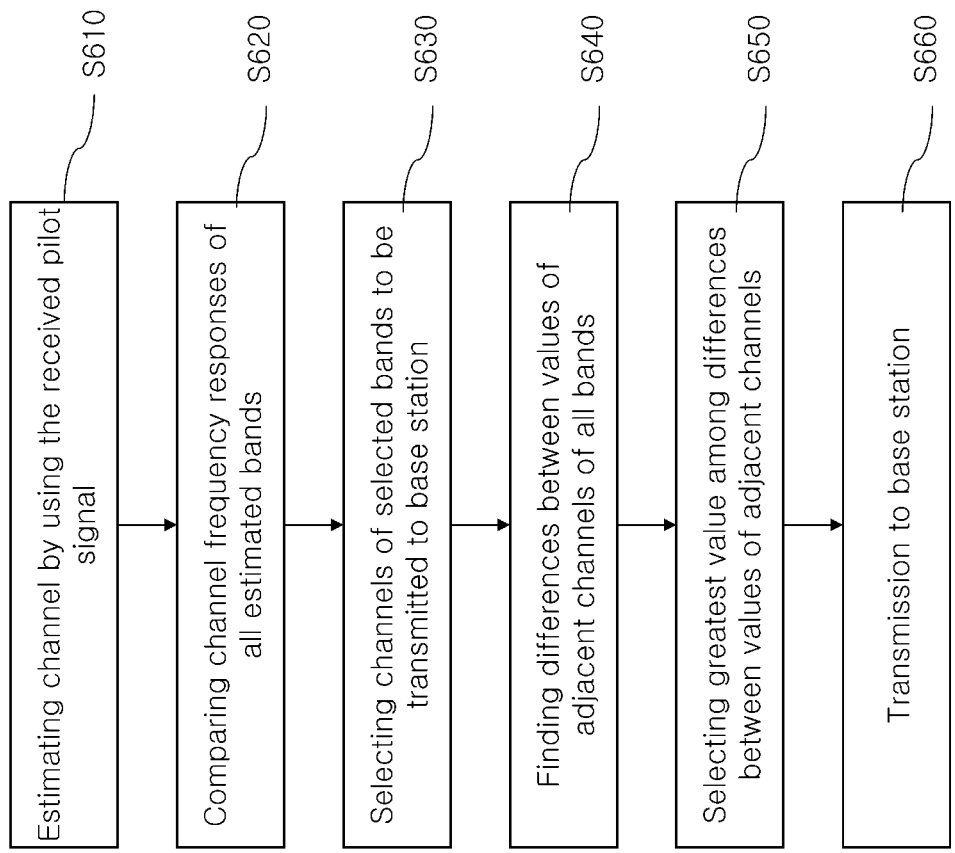
FIG. 6 shows a flowchart representing a method for transmitting the channel information of the selected band and the additional channel information from the terminal to the base station according to the exemplary embodiment of the present invention.

FIG. 6 shows a flowchart representing a method for transmitting the channel information of the selected band and the additional channel information from the terminal to the base station according to the exemplary embodiment of the present invention.

A method for generating the channel information and the additional channel information on the selected bands by using the pilot signal transmitted from the base station to transmit the generated information to the base station will now be described.

Firstly, the channel estimator 512 of the terminal receives the pilot signal from the base station, and estimates the channel by using the received pilot signal in step S610. When the channel estimation is completed, the channel information is found by comparing the channel frequency responses of all the estimated bands in step S620.

When comparing the channel frequency responses is completed, the channel information on bands to be transmitted to the base station is determined by using the frequency response on the estimated channel. Step S630 for determining the channel information may include a step for generating the channel information of bands having a higher value to be transmitted to the base station by using the channel information on the bands found in step S620, and a step for generating channel information estimating the channel information on all the bands by using the frequency responses of all the band channels.

In addition, differences between values of adjacent channels of all the is bands are found in step S640, and the greatest value among the differences is selected to generate the additional channel information for estimating the remaining bands in step S650.

When the channel information on the selected bands and the additional channel information have been generated in steps S630 to S650, the generated information is transmitted to the base station in step S660.

Figure 7:
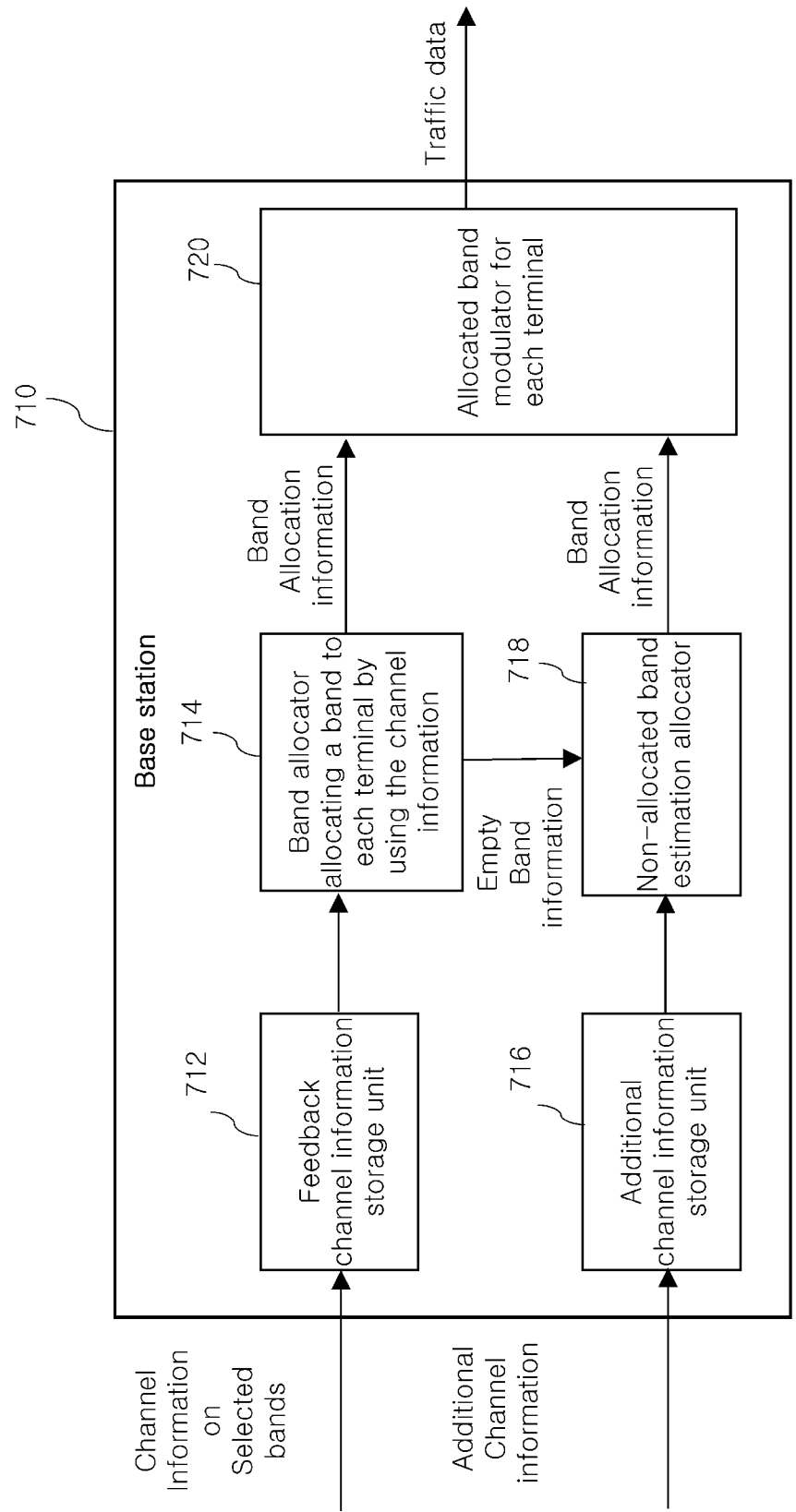
FIG. 7 shows a block diagram representing a base station for allocating the bands to the respective terminals based on the channel information transmitted from a terminal according to the exemplary embodiment of the present invention.

FIG. 7 shows a block diagram representing a base station for allocating the bands to the respective terminals based on the channel information transmitted from a terminal according to the exemplary embodiment of the present invention.

When the channel information and the additional channel information on the selected bands are transmitted from the terminal as shown in FIG. 6, the base station receives the channel information on the selected bands through a feedback channel information storage unit 712. When the feedback channel information storage unit 712 receives the channel information on the selected band, a band allocator 714 for allocating a band to each terminal by using the channel information generates band allocation information for allocating the channel information on the selected bands to the terminal. A method for allocating the band to the respective terminals is shown a Math Figure 4.

$$ChAl_i = \max_k(H_{k,i})$$ [MathFigure 4]

$$k' = \underset{k}{\operatorname{argmax}}(H_{k,i})$$

$$C_{k'} = C_{k'} \cup \{i\}$$

Here, $ChAl_i$ denotes the greatest channel information among the channel information on all the terminals of an $i^{th}$ band, and $C_k$ denotes a band allocated to a $k^{th}$ terminal. In addition, the band allocator 714 for allocating the band to the respective terminals by using the channel information transmits information on empty bands not allocated to the terminals to a non-allocated band estimation allocator 718.

In addition, an additional channel information storage unit 716 of the base station stores the additional channel information, and transmits the stored additional information to the non-allocated band estimation allocator 718.

The non-allocated band estimation allocator 718, after receiving the additional information from the additional channel information storage unit 716 and receiving the non-allocated band information from the band allocator 714, estimates channels as shown in Math Figure 5 by using the selected channel information.

if $ChAl_i = 0$ [MathFigure 5]

for $k = 1; K$ $$E_{k,i} = \max_j(CH_k(j) - \alpha_{k,i}(j)D_k)$$

end $$ChAl_i = \max_{k, \#C_k < F}(E_{k,i})$$

$$k' = \arg\max_{k, \#C_k < F}(E_{k,i})$$

$$C_{k'} = C_{k'} \cup \{i\}$$

Here, i=1:N, $\#C_k$ denotes the number of bands allocated to a $k^{th}$ terminal, and F denotes a maximum number of bands allocated to a terminal. In addition, $E_{k,i}$ denotes an estimate value of an $i^{th}$ band channel of the $k^{th}$ terminal, and the estimate value is estimated by using the channel transmitted from the terminal.

Accordingly, the non-allocated band estimation allocator 718 may estimate channel information on a desired band by using a distance difference between the band to be estimated and the additional channel information transmitting the greatest value among channel frequency response differences. In addition, $a_{k,i(j)}$ denotes the number of bands between an $i^{th}$ band to be estimated by a $k^{th}$ terminal and a $i^{th}$ greatest channel transmitted to the terminal.

When the band allocation information is generated as shown in Math Figure 4 and Math Figure 5 as described above, the generated band allocation information is allocated to the respective terminals. Then, an allocated band modulator 720 for each terminal modulates the band allocation information and transmits traffic data.

Figure 8:
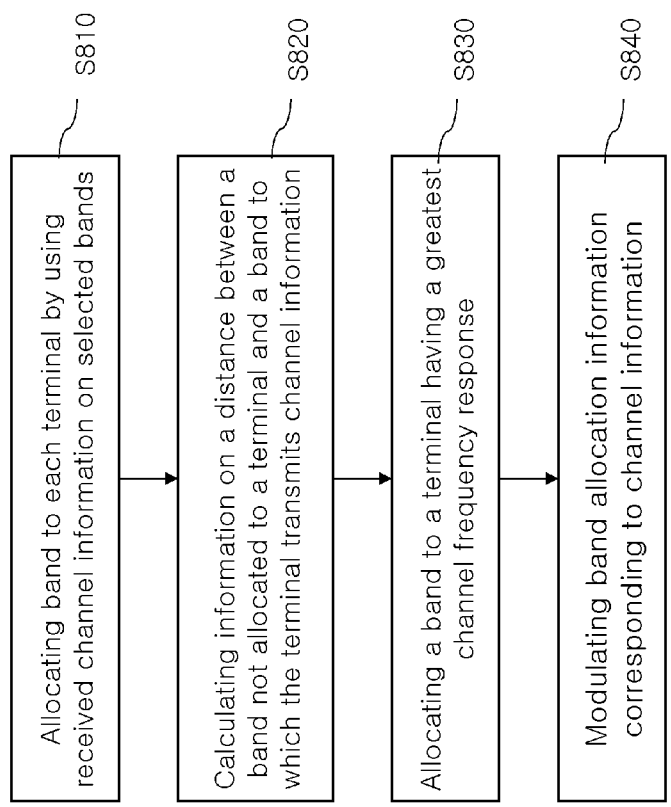
FIG. 8 shows a flowchart representing a method for allocating the bands to each terminal by using the channel information on the selected bands according to the exemplary embodiment of the present invention.

FIG. 8 shows a flowchart representing a method for allocating the bands to each terminal by using the channel information on the selected bands according to the exemplary embodiment of the present invention.

When the feedback channel information storage unit 712 of the base station receives the channel information on the selected bands from the terminal, the band allocator 714 for allocating the band to each terminal by using the received channel information on the selected bands allocates the bands to the respective terminals in step S810.

The bands other than the bands allocated to the terminals in step S810 are allocated to the terminals by using the additional channel information. Accordingly, the base station calculates information on a distance between the band not allocated to the terminal and the band to which the terminal transmits the channel information in step S820, uses the calculated distance information to estimate the channel information on the band not allocated to the terminal, and allocates the band to a terminal having a greatest channel frequency response in step S830.

In addition, the band allocation information allocated to the respective terminals in steps S810 to S830 is modulated by a modulator, and the traffic data are transmitted to the respective terminals in step S840.

Figure 9:
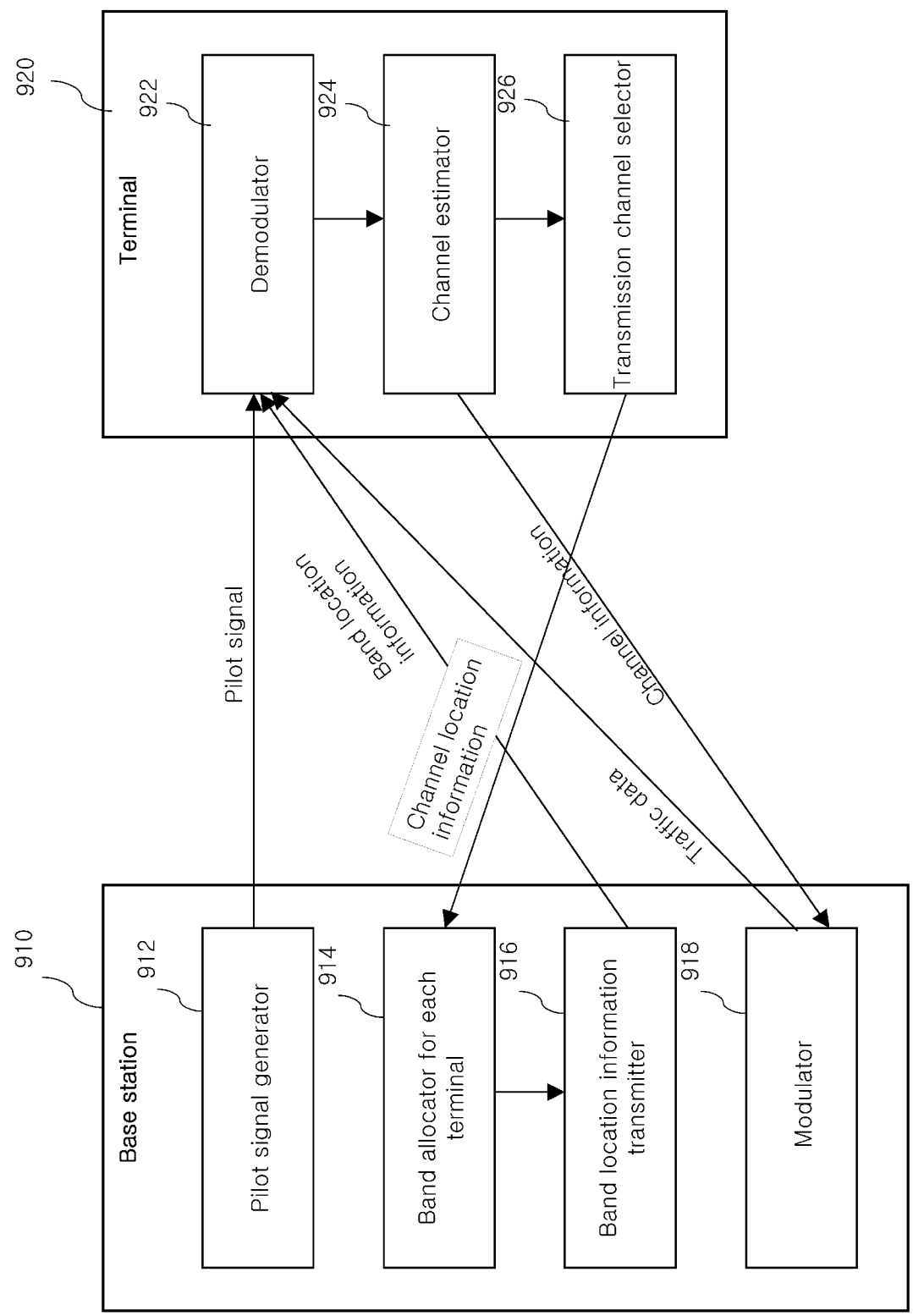
FIG. 9 shows a diagram representing a method for allocating the band by the base station by using the channel location information and the additional channel information received from the terminal according to the exemplary embodiment of the present invention.

FIG. 9 shows a diagram representing a method for allocating the band by the base station by using the channel location information and the additional channel information received from the terminal according to the exemplary embodiment of the present invention.

A base station 910 according to the exemplary embodiment of the present invention includes a pilot signal generator 912, a band allocator 914 for each terminal, a band location information transmitter 916, and a modulator 918, and a terminal 920 includes a demodulator 922, a channel estimator 924, and a transmission channel selector 926.

The demodulator 922 of the terminal 920 receives a pilot signal generated by the pilot signal generator 912 of the base station 910 and demodulates the generated pilot signal, and the channel estimator 924 estimates a radio channel. When the channels of all the bands are estimated by the channel estimator 924, the transmission channel selector 926 selects the channel to be transmitted to the base station 910, and transmits the location band information on the channel selected by the transmission channel selector 926. The band allocator 914 for each terminal uses the transmitted channel location information to allocate the band of the channels for the respective terminals, and the band location information transmitter 916 transmits band locations for the respective terminals by using the allocated band location information. When the demodulator 922 of the terminal 920 demodulates the transmitted band location information, the channel estimator 924 transmits the channel information on the selected bands to the base station 910. The modulator 918 for receiving the channel information modulates the traffic data to transmit it to the terminal 920.

Figure 10:
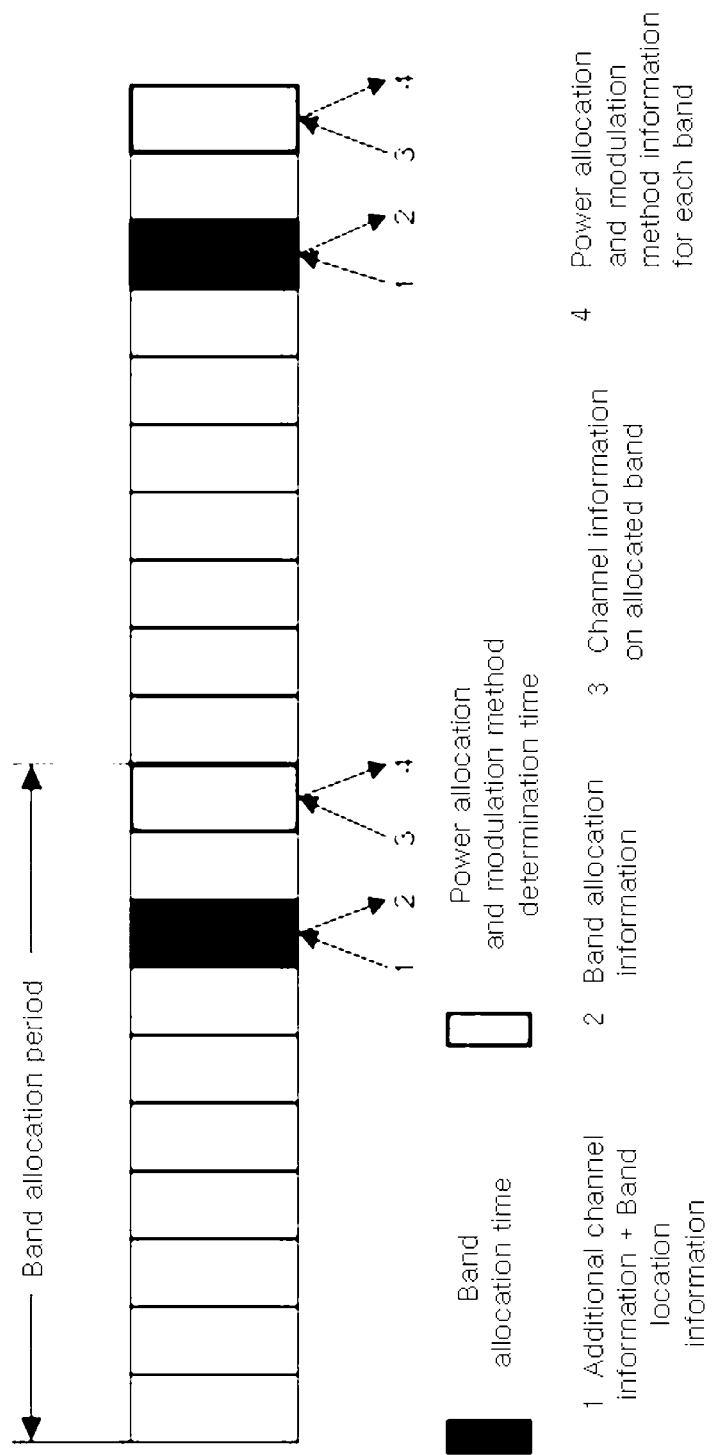
FIG. 10 shows a diagram representing a band allocation method according to a passage of time in the frequency division multiple access mobile communication system.

FIG. 10 shows a diagram representing a band allocation method according to a passage of time in the frequency division multiple access mobile communication system.

In the conventional band allocation method, when a band is allocated, the channel information of selected bands is fed back to the base station so that the base station performs band allocation for each terminal, and the base station performs modulation and power allocation to transmit the traffic data to the terminal according to the result of the band allocation. However, according to the exemplary embodiment of the present invention, when the terminal transmits the band location information on the selected band and the additional channel information which is first feedback information to the base station before the band is allocated, the base station allocates the band based on the information and transmits the allocated band information to the terminal. When the terminal transmits second feedback information, which is the channel information on the allocated band, to the base station according to the transmitted band information, the base station performs the modulation and power allocation, which is shown in FIG. 10.

Figure 11:
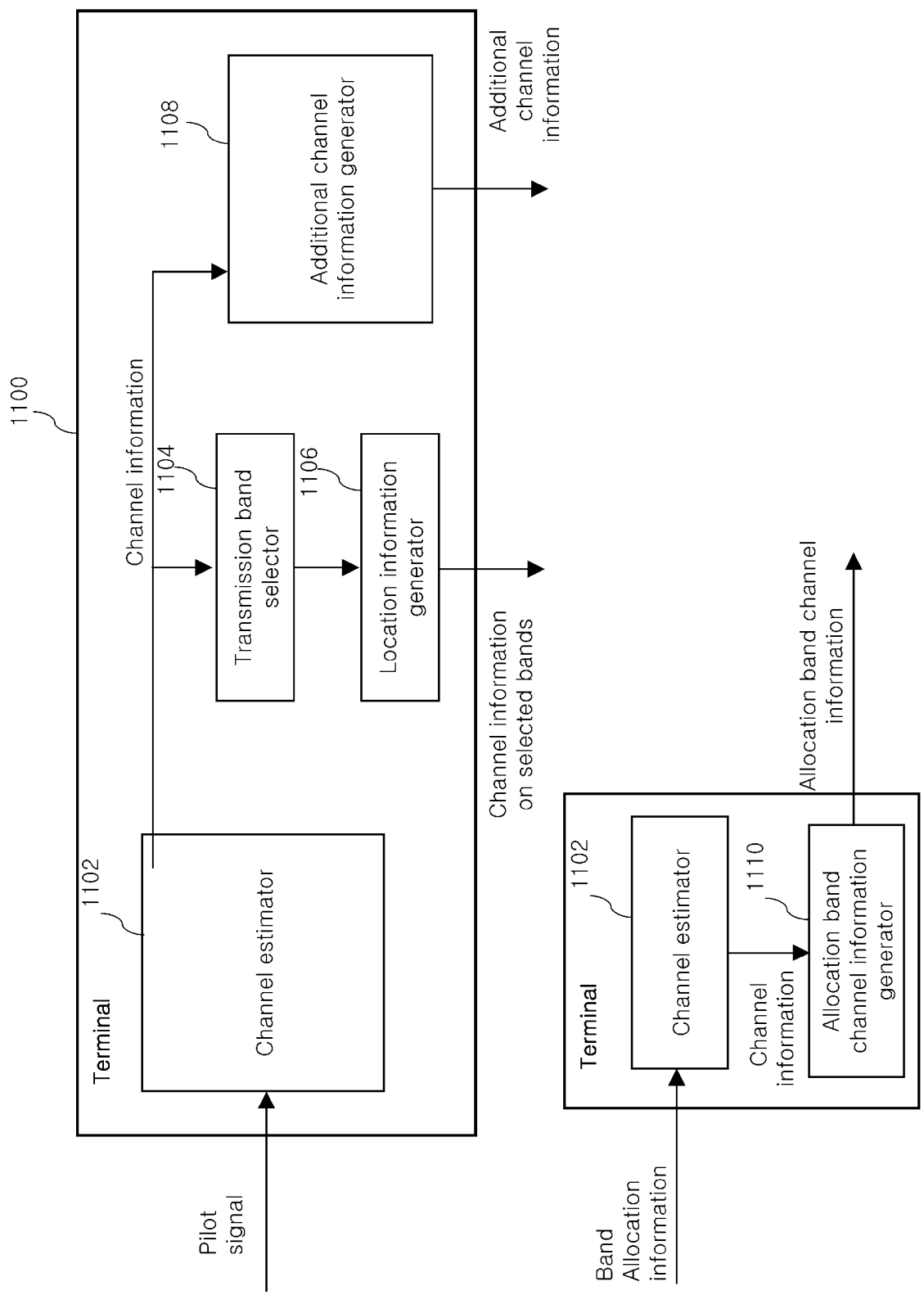
FIG. 11 shows a block diagram of an internal configuration of the terminal transmitting the first feedback information, receiving the band allocation information from the base station, generating the second feedback information, and transmitting the second feedback information to the base station.

FIG. 11 shows a block diagram of an internal configuration of the terminal transmitting the first feedback information, receiving the band allocation information from the base station, generating the second feedback information, and transmitting the second feedback information to the base station.

A terminal 1100 according to the exemplary embodiment of the present invention uses a pilot signal transmitted from the base station to estimate the channel frequency responses of all the bands by a channel estimator 1102. After the response estimation, a transmission band selector 1104 uses the estimated channel information to select the channel to be transmitted to the base station, and a location information generator 1106 generates the location information on the channels of the selected bands. The generated channel location information $U_{k(j)}$ indicates a frequency band location of $y_{k(j)}$, and the location information generator 1106 transmits the generated $U_k=\{U_k 1, U_k 2, \ldots, U_k(I)\}$ to the base station.

In addition, an additional channel information generator 1108 generates additional information including an average value of the channel information on the band transmitted to the base station as shown in Math Figure 6, and transmits the additional information to the base station to estimate and select the rest of the bands.

$$AVE_k = \frac{1}{I}\sum_{i=1}^{I} CH_k(i) \qquad \text{[MathFigure 6]}$$

When the base station performs the band allocation by using the selected band channel location information which is the first feedback information and the additional channel information, and transmits the allocated band, the channel estimator 1102 of the terminal 1100 receives the allocated band and an allocation band channel information generator 1110 generates allocation band channel information which is the second feedback information so as to transmit the generated allocation band channel information back to the base station.

Figure 12:
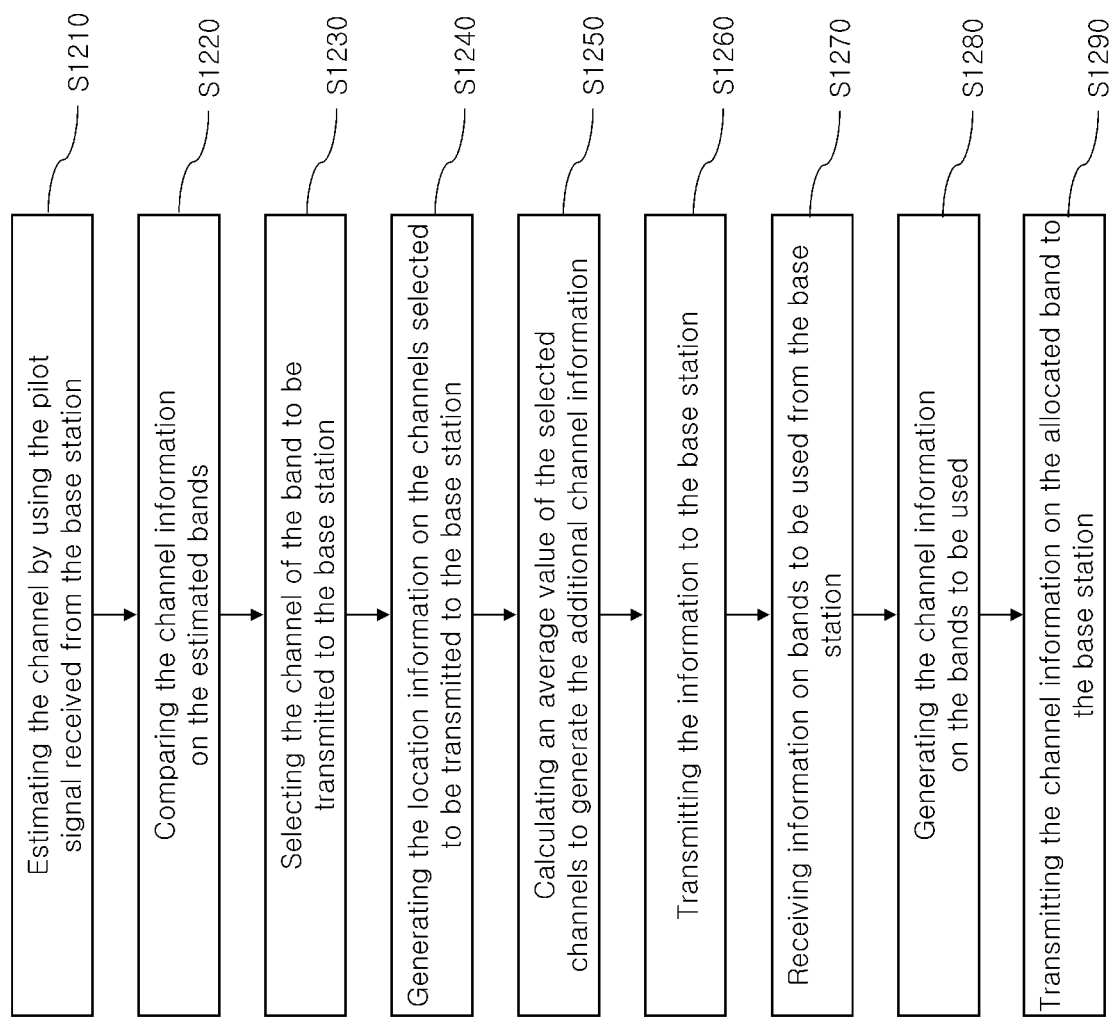
FIG. 12 shows a flowchart for representing a method for transmitting the first feedback information, receiving the band allocation information from the base station, and transmitting the second feedback information according to the exemplary embodiment of the present invention.

FIG. 12 shows a flowchart for representing a method for transmitting the first feedback information, receiving the band allocation information from the base station, and transmitting the second feedback information according to the exemplary embodiment of the present invention.

The channel estimator 1102 of the terminal estimates the channel in step S1210 by using the pilot signal received from the base station. The transmission band selector 1104 compares the channel information on the estimated bands in step S1220 to select the band having the great channel frequency response as the channel of the band to be transmitted to the base station in step S1230.

When the channel is selected, the channel is expressed as bits to be adaptively transmitted to the base station. Accordingly, the location information generator 1106 generates the location information on the channels selected to be transmitted to the base station in step S1240, and the additional channel information generator 1108 calculates an average value of the selected channels to generate the additional channel information in step S1250.

When the selected channel information and the additional channel information are generated, the terminal transmits the information to the base station in step S1260 and receives information on bands to be used from the base station in step S1270. The terminal generates the channel information in step S1280 according to the band allocation information received from the base station, and expresses the channel information on the allocated band as bits to be transmitted to the base station in step S1290.

Figure 13:
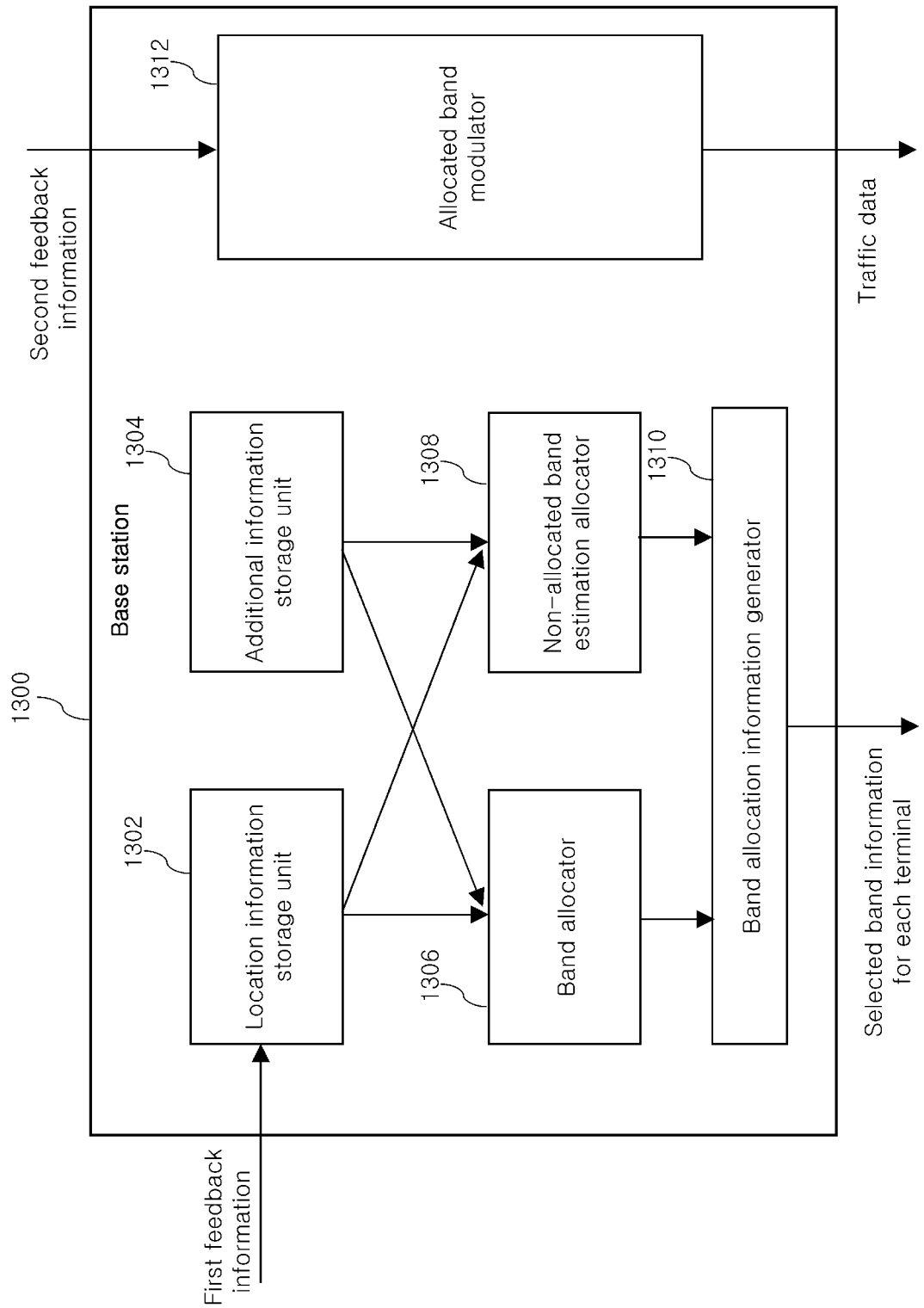
FIG. 13 shows a block diagram of an internal configuration of a base station receiving the first feedback information from the terminal, allocating the band, receiving the second feedback information, and transmitting the traffic data according to the exemplary embodiment of the present invention.

FIG. 13 shows a block diagram of an internal configuration of a base station receiving the first feedback information from the terminal, allocating the band, receiving the second feedback information, and transmitting the traffic data according to the exemplary embodiment of the present invention.

The base station according to the exemplary embodiment of the present invention includes a location information storage unit 1302 for storing location information on the selected band channels fed back from the terminal, an additional information storage unit 1304 for storing additional information on the channel fed back from the terminal, a band allocator 1306 for allocating a band to each terminal by using the channel location information and the additional information, a non-allocated band estimation allocator 1308 for allocating bands not transmitted by the terminal to each terminal, a band allocation information generator 1310 for generating information on the allocated band, and an allocated band modulator 1312 for receiving the second feedback information and modulating the received second feedback information to transmit it to the terminal.

The band allocator 1306 for receiving the second feedback information is which is the location information on the selected bands and the additional information allocates the bands for the respective terminals as shown in Math Figure 7.

$$P \leftarrow 1 \times N \text{ zero vector} \qquad \text{[MathFigure 7]}$$

$$U = \phi$$

$$\text{for } l = 1:K_{cell}$$

$$M = \{1, L, K_{cell}\} - U$$

$$k = \underset{m \in M}{\operatorname{argmax}}(AVE_m)$$

$$\text{for } n = 1:N$$

$$\text{if } P_k(n) = 1 \text{ and } P(n) = 0 \text{ and } \#C_k < F$$

$$C_k = C_k U\{n\}$$

$$P(n) = 1$$

$$\text{end}$$

$$U = U \cup \{k\}$$

$$\text{end}$$

Here, P denotes a 1×N vector, $P_k$ denotes a 1×N vector in which $U_k(1)^{th}, U_k(2)^{th}, \ldots,$ and $U_k(I)^{th}$ elements are 1 and the other elements are 0, $K_{cell}$ denotes the number of terminals selected by the base station, P(n) denotes an $n^{th}$ element of a P vector, and $P_k(n)$ denotes an $n^{th}$ element of a $P_k$ vector.

In addition, after the band allocator 1306 allocates the band, and the non-allocated band estimation allocator 1308 for allocating bands that are not transmitted allocates the remaining bands to each terminal as shown in Math Figure 8.

$$i = 1 \quad \text{[MathFigure 8]}$$
$$\text{for } n = 1:N$$
$$\text{if } P(n) = 0$$
$$\text{while}$$
$$Q_n = \{k \mid P_k(n-i) = 1 \text{ or } P_k(n+i) = 1 \text{ and } \#C_k < F\}$$
$$\text{if } Q_n \text{ not empty}$$
$$k' = \underset{k \in Q_n}{\operatorname{argmax}}(AVE_k)$$
$$\text{break}$$
$$\text{else}$$
$$i = i + 1$$
$$\text{end}$$
$$C_{k'} = C_{k'} \cup \{n\}$$

When the band allocation for each terminal is completed by using Math Figure 7 and Math Figure 8, the band allocation information generator 1310 transmits the allocated band information to the respective terminals.

Figure 14:
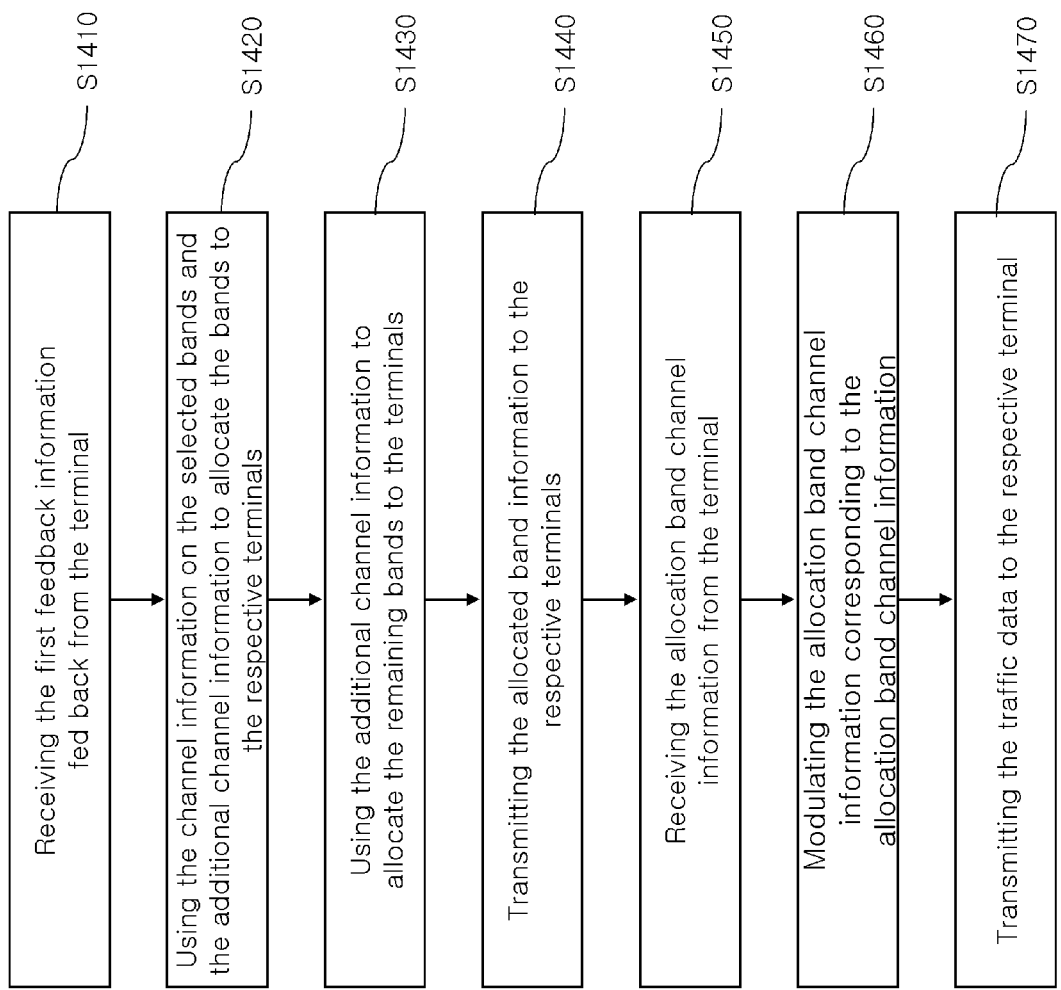
FIG. 14 shows a flowchart for representing a method for receiving the first feedback information from the terminal, allocating the band, receiving the second feedback information, and transmitting the traffic data according to the exemplary embodiment of the present invention.

FIG. 14 shows a flowchart for representing a method for receiving the first feedback information from the terminal, allocating the band, receiving the second feedback information, and transmitting the traffic data according to the exemplary embodiment of the present invention.

The base station receives the first feedback information which is the channel information on the selected bands for the respective terminals and the additional channel information which is an average of the channel information of the selected bands in step S1410. In addition, the band allocator 1306 uses the channel information on the selected bands and the additional channel information to allocate the bands to the respective terminals in step S1420, and is the non-allocated band estimation allocator 1308 uses the additional channel information to allocate the remaining bands to the terminals in step S1430.

In addition, the base station transmits the allocated band information to the respective terminals in step S1440, and receives the allocation band channel information transmitted by the respective terminals as the second feedback information in step S1450. The base station receiving the second feedback information modulates the allocation band channel information transmitted by the terminal in step S1460, and transmits the traffic data to the respective terminals in step S1470.

Accordingly, when the base station receives the location information on the selected bands and the additional channel information from the terminal, the base station uses the location information to allocate the bands to the respective terminals, uses the additional information to allocate the bands not allocated to the respective terminals, transmits the band location information to the respective terminals, receives the channel information on the allocated bands from the respective terminals, modulates the channel information, and transmits the traffic data.

Figure 15:
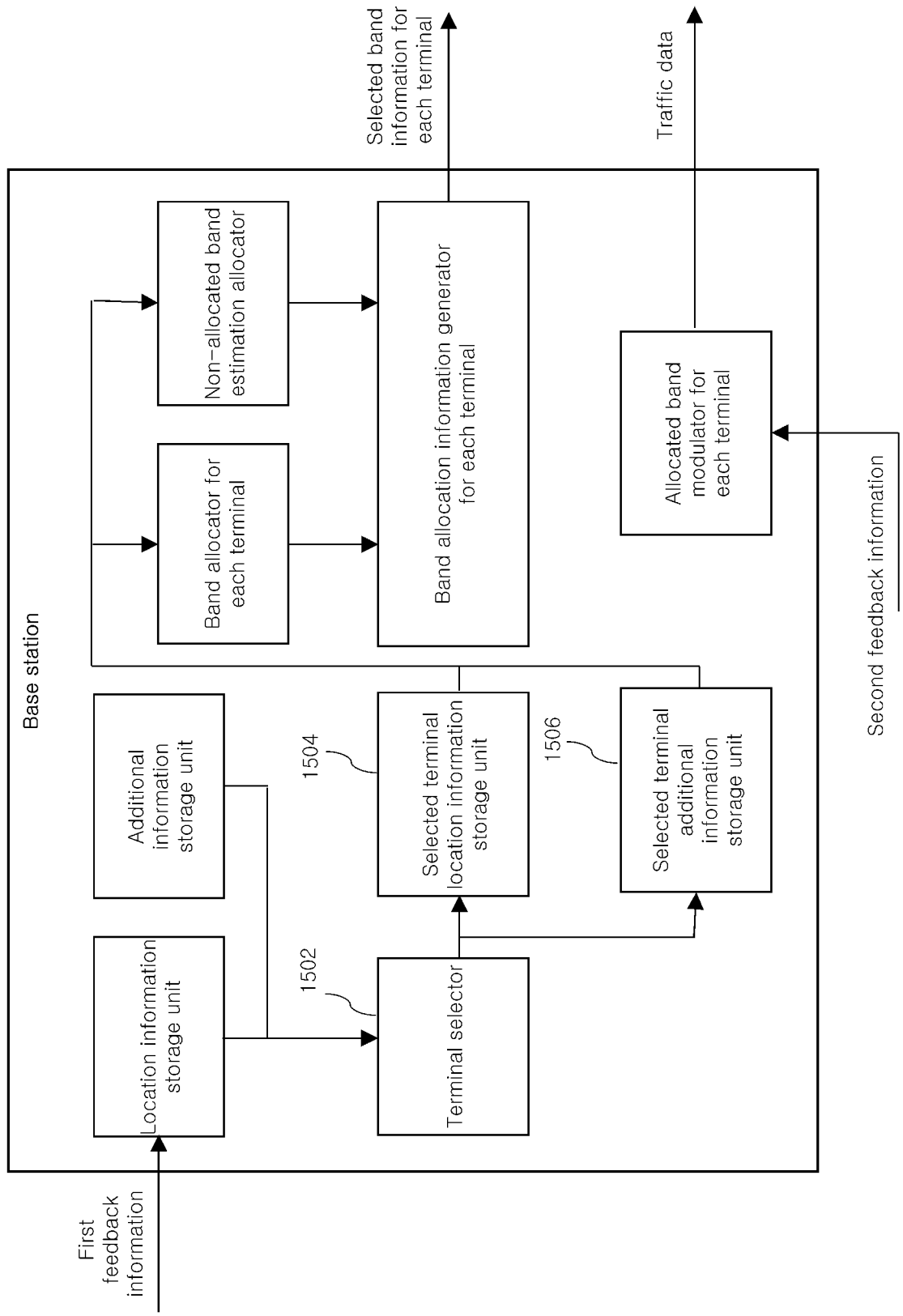
FIG. 15 shows a block diagram of an internal configuration of a base station using the band location information and the additional channel information to select terminals receiving the data, and allocating the bands to the selected terminals according to the exemplary embodiment of the present invention.

FIG. 15 shows a block diagram of an internal configuration of a base station using the band location information and the additional channel information to select terminals receiving the data, and allocating the bands to the selected terminals according to the exemplary embodiment of the present invention.

The diagram of the base station shown in FIG. 15 is a detailed diagram of the base station shown in FIG. 13, and the base station shown in FIG. 15 further includes a terminal selector 1502, a selected terminal location information storage unit 1504, and a selected terminal additional information storage unit 1506. The terminal selector 1502 uses the selected band channel location information received from the location information storage unit 1302 and the additional information received from the additional information storage unit 1304 to select the terminal to which the band is allocated.

The terminal selector 1502 uses the channel information stored in the location information storage unit 1302 and the additional information storage unit 1304 to select the terminal receiving the data from the base station. The terminal is selected as shown in Math Figure 9.

$$N_{UE} = 1 \quad \text{[MathFigure 9]}$$
$$u = \underset{k}{\operatorname{argmax}}(AVE_k)$$
$$P = P_u$$
$$U_{N_{UE}} = \{u\}$$
$$\text{while } N_{UE} < K_{cell} \text{ do}$$
$$k \in \{1, L, K\} - U_{N_{UE}}$$
$$Cost_k = \left( \begin{array}{c} A(P_k - P) + \\ \beta(N - A(P_k + P)) \end{array} \right) \times (AVE_k)$$
$$l = \operatorname{argmax}(Cost_k)$$
$$N_{UE} = N_{UE} + 1$$
$$U_{N_{UE}} = U_{N_{UE}} \cup \{l\}$$
$$P = P \oplus P_l$$
$$\text{end}$$

Here, $U_{NUE}$ denotes a terminal selected by the base station, $Cost_k$ denotes a Cost function of a $k^{th}$ terminal, and A(P) denotes the number of elements of a vector P, the number of elements being greater than 0. In addition, β is an empty band allocation coefficient which is established as a value between 0 and 1, and $\oplus$ denotes an OR operation.

When the terminal selector 1502 selects the terminal to which the band is allocated, the band allocator 1306 for each terminal uses the channel location information on the selected bands and the additional channel information generated by using Math Figure 7 so as to allocate the band, and the non-allocated band estimation allocator 1308 finds the bands not allocated by using Math Figure 8 to allocate the non-allocated bands to the respective terminals. Then, the band allocation information generator 1310 transmits the allocated band location information to the selected terminals, and receives the terminal allocation band channel information which is the second feedback information, and the allocated band modulator 1312 modulates the received terminal allocation band channel information and transmits the traffic data to the terminal.

Figure 16:
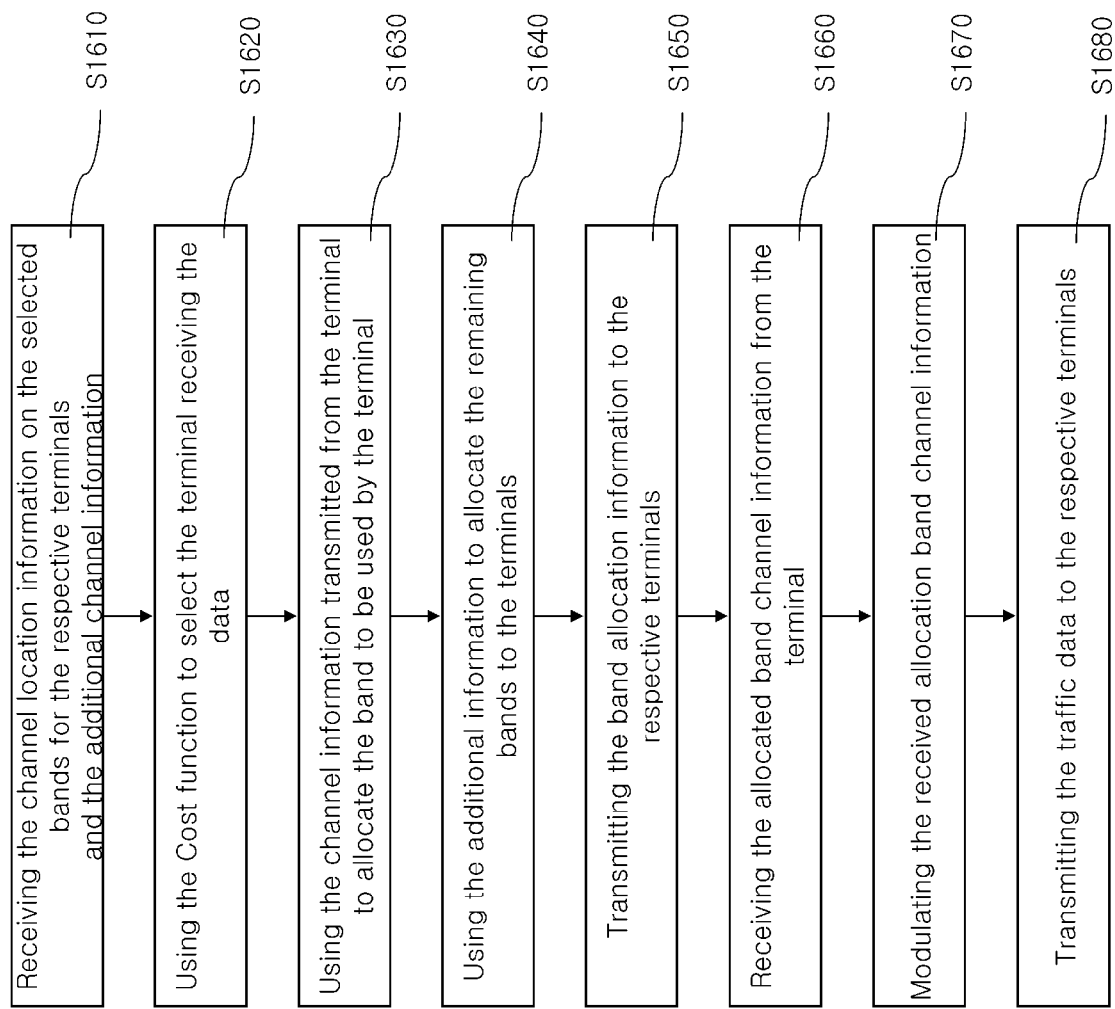
FIG. 16 shows a flowchart for representing a method for using the band location information and the additional channel information to select the terminals receiving the data from the base station, and allocate the bands to the selected terminals.

FIG. 16 shows a flowchart for representing a method for using the band location information and the additional channel information to select the terminals receiving the data from the base station, and allocate the bands to the selected terminals.

The base station receives the channel location information on the selected bands for the respective terminals and the additional channel information which is the average of the channel information of the selected bands in step S1610, and uses the Cost function of Math Figure 9 to select the terminal receiving the data in step S1620.

When the terminal receiving the data is selected, the base station uses the channel information transmitted from the terminal to allocate the band to be used by the terminal in step S1630, and uses the additional information to allocate the remaining bands to the terminals in step S1640.

When the channel information is allocated to the respective terminals, the base station transmits the band allocation information to the respective terminals in step S1650. The terminal receiving the band allocation information generates the channel information on the bands to be used by the terminals, and transmits the channel information to the base station. The base station receives the channel information on the bands to be used (i.e., the allocation band channel information which is the second feedback information) in step S1660, modulates the received allocation band channel information in step S1670, and transmits the traffic data to the respective terminals in step S1680.

Figure 17:
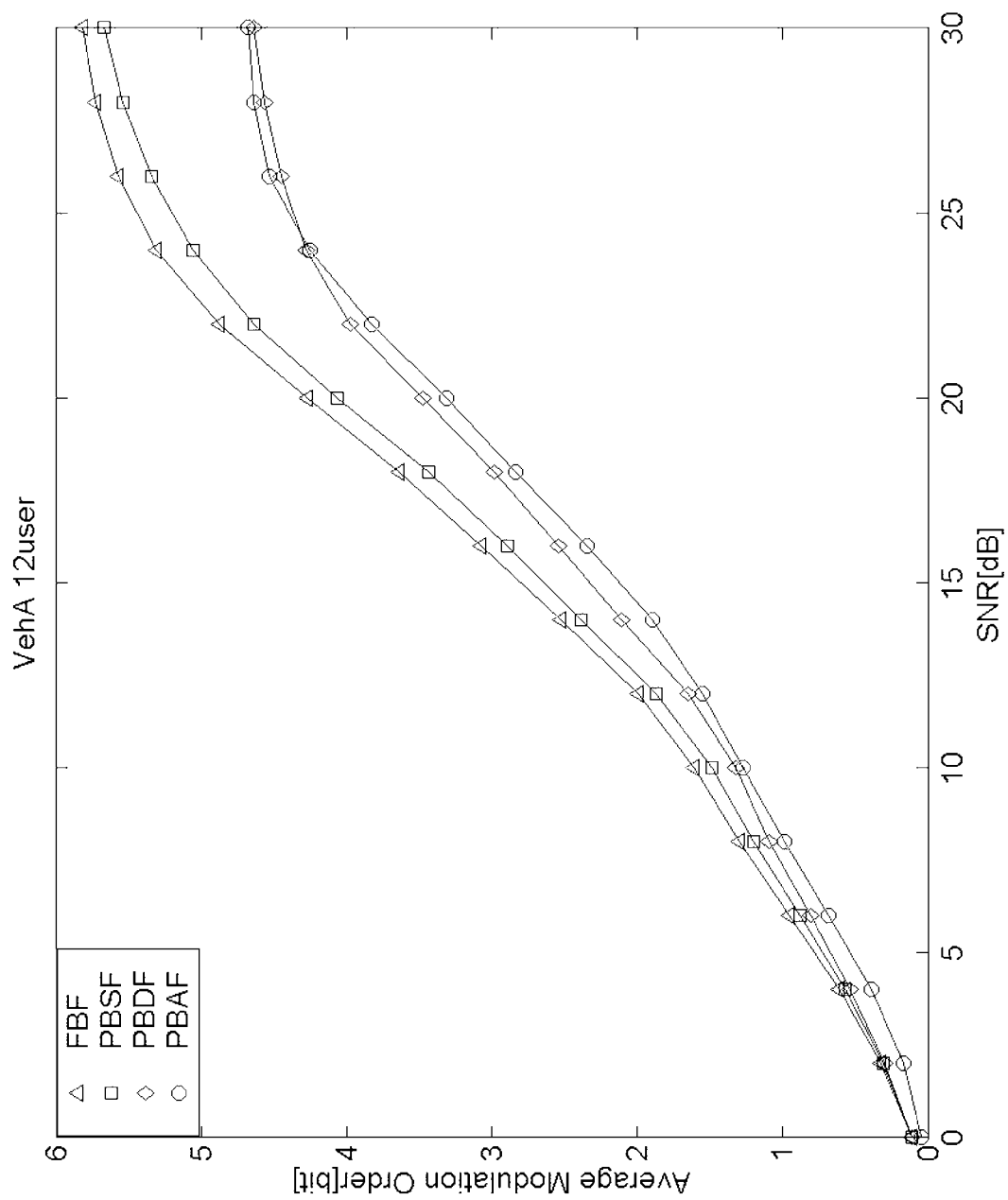
FIG. 17 shows a graph for comparing system performance when the terminal transmits the channel information on the selected bands to the base station according to the exemplary embodiment of the present invention with system performance when the terminal transmits the channel information of all the bands according to the prior art.

FIG. 17 shows a graph for comparing system performance when the terminal transmits the channel information on the selected bands to the base station according to the exemplary embodiment of the present invention with system performance when the terminal transmits the channel information of all the bands according to the prior art.

The graph compares the system performance between the frequency division multiple access mobile communication system transmitting all the bands and the frequency division multiple access mobile communication system transmitting the selected bands (8.3% of all the bands) according to the exemplary embodiment of the present invention. In FIG. 17, FBF denotes a method for transmitting the channel information on all the bands to the base station and performing the band allocation for each terminal, and PBSF denotes a method for transmitting the selected band channel location information and the additional channel information as the first feedback information to the base station, and transmitting the allocation band channel information as the second feedback information to the base station after the base station performs the band allocation for each terminal and transmits the allocation information to the terminal.

PBDF and PBAF are adaptive transmitting methods for transmitting the channel information on the selected bands and the additional channel information to the base station. In further detail, the PBDF is a method for transmitting the additional channel information including a channel information difference between neighboring bands, and the PBAF is a method for transmitting average information on all the bands to the base station.

As shown in the FIG. 17, the performance degradation in the PBSF, PBDF, and PBAF transmitting the channel information on the selected bands according to the exemplary embodiment of the present invention is reduced compared to the FBF transmitting the channel information on all the bands according to the prior art.

FIG. 18 shows a table comparing the amount of information when the terminal transmits the channel information on the selected bands to the base station according to the exemplary embodiment of the present invention, and when the terminal transmits the channel information on all the bands to the base station according to the prior art.

In FIG. 18, the table compares the amount of information between the frequency division multiple access mobile communication system transmitting all the bands and the frequency division multiple access mobile communication system transmitting the selected bands (8.3% of all the bands) according to the exemplary embodiment of the present invention.

As shown in FIG. 18, when a mobile communication system having a total band of 96 channels, the allocated band of 8 channels for each terminal, 5 bits for each channel, and band location information of 7 bits for each channel transmits all the bands, the number of required bits is 480. In addition, when the selected bands are transmitted according to the exemplary embodiment of the present invention, 21% of bits used in the conventional communication system may be used since 101 bits are required to perform the transmission. As described above, since the band information is transmitted by using fewer bits, the overhead occurring in the base station may be reduced.

The above described methods and apparatuses are not only realized by the exemplary embodiment of the present invention, but, on the contrary, are intended to be realized by a program for realizing functions corresponding to the configuration of the exemplary embodiment of the present invention or a recoding medium for recoding the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, since the channel information on the selected bands for each terminal is fed back to the base station or the location information on the allocated channels and the average information on the channel frequency responses are fed back to the base station when the frequency division multiple access mobile communication system performs the adaptive transmission, the overhead occurring in the base station due to a lot of information may be reduced, and the interference caused by the transmission information may be reduced at the terminal.

In addition, according to the exemplary embodiment of the present invention, when the same amount of information is transmitted to the base station, the performance in the mobile communication system may be increased by efficiently performing the band allocation for each terminal in a system having frequent channel variations, since the system transmitting the channel information on the selected bands according to the exemplary embodiment of the present invention transmits the channel information more frequently than the conventional system that transmits all the bands.

The invention claimed is:

1. A method for transmitting feedback information to a base station to perform adaptive communication by a terminal in a mobile communication system, the method comprising:
   a) receiving a pilot signal from the base station to generate channel information on bands;
   b) comparing the channel information on the bands to select a channel of a selected band to be transmitted to the base station;
   c) generating channel location information and additional channel information from the selected channel, and transmitting the channel location information and the additional channel information as first feedback information to the base station;
   d) receiving band allocation information on bands to be used from the base station; and
   e) generating allocation band channel information corresponding to the received band allocation information, and transmitting the allocation band channel information as second feedback information to the base station.

2. A method for a terminal to transmit information on a channel including N bands to a base station, wherein N is a natural number, the method comprising:

selecting m band(s) among the entire N bands, wherein m is a natural number and is less than N;

calculating one channel quality information that represents channel quality of the entire N bands; and transmitting, to the base station, a channel quality information of the selected m band(s), channel location information of the selected m band(s), and the one channel quality information that represents channel quality of the entire N bands.

3. The method of claim 2, wherein the terminal selects the m band(s) among the entire N bands based on channel quality information estimated by using a pilot signal transmitted from the base station.

4. The method of claim 2, wherein the bit length of the one channel quality information that represents channel quality of the entire N bands is less than the bit length of information comprising each individual channel quality information of the N bands.

* * * * *